Feb. 6, 1968   J. D. RICHARD   3,367,191
WATER SAMPLING APPARATUS
Filed Oct. 22, 1965   2 Sheets-Sheet 1
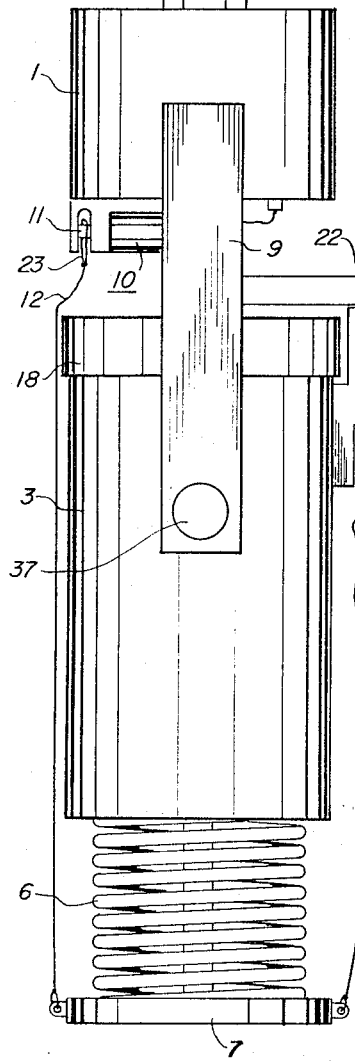
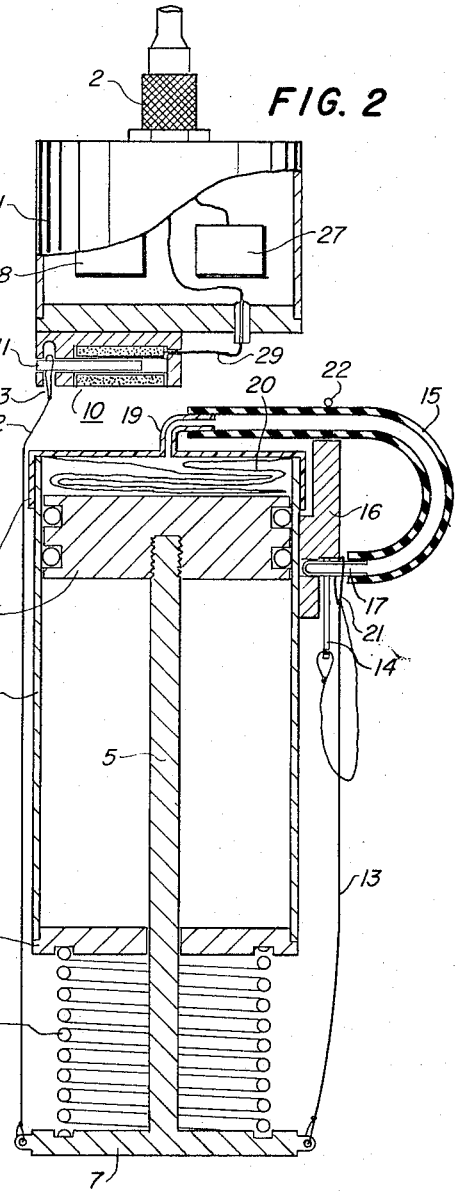
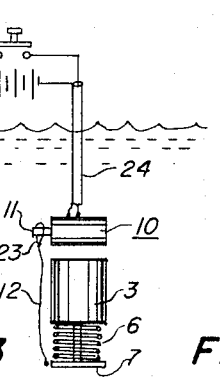
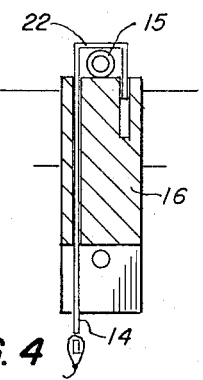
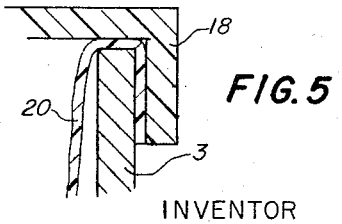
INVENTOR
Joseph D. Richard Feb. 6, 1968    J. D. RICHARD    3,367,191
WATER SAMPLING APPARATUS
Filed Oct. 22, 1965    2 Sheets-Sheet 2
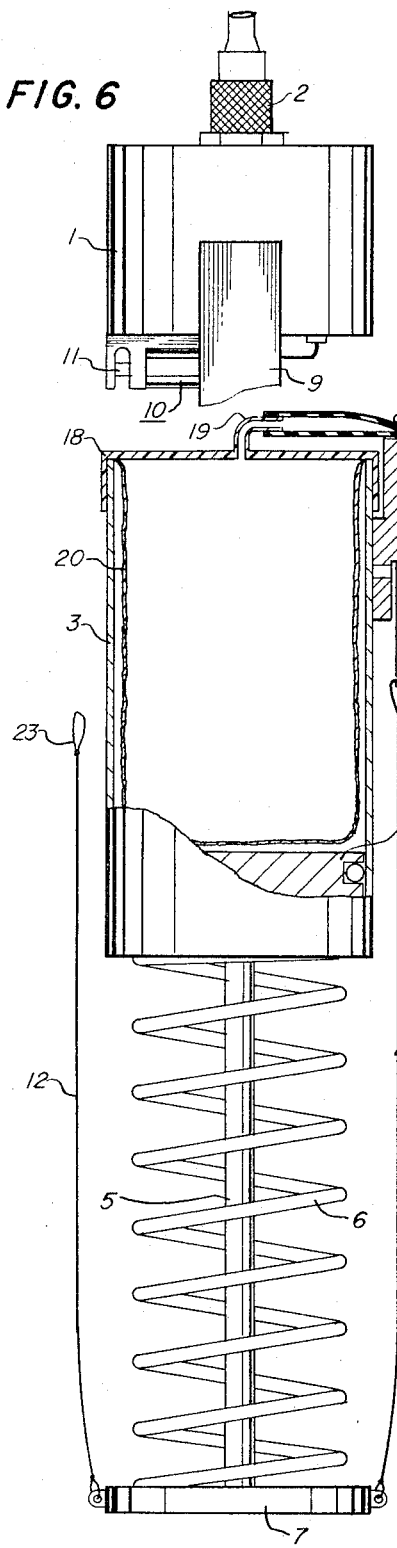
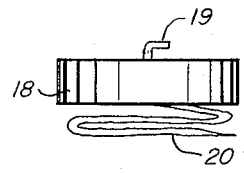
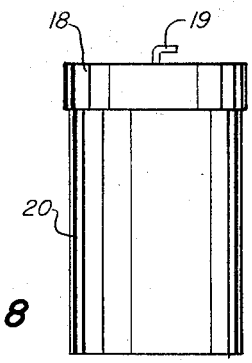
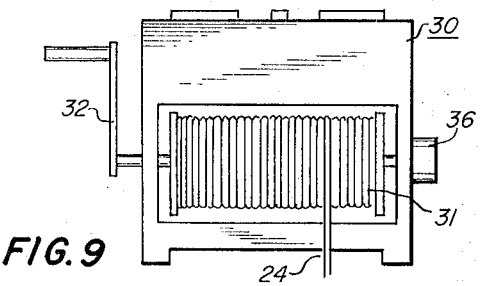
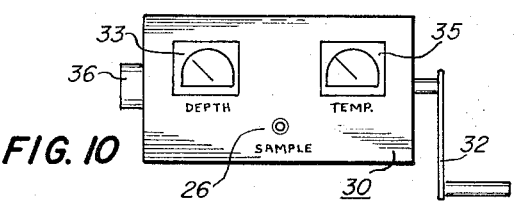
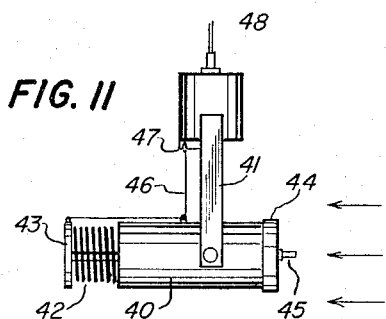
INVENTOR
Joseph D. Richard

3,367,191
WATER SAMPLING APPARATUS
Joseph D. Richard, 3613 Loquat Ave., Miami, Fla. 33133
Filed Oct. 22, 1965, Ser. No. 501,100
4 Claims. (Cl. 73—425.6)

This invention relates generally to apparatus for sampling a liquid medium and, more particularly, to remotely controlled apparatus for obtaining samples from a body of water which are entirely free from contamination by the sampling mechanism and sample container.

In limnological and oceanographical research and in surveys of microbiological or chemical contamination it is frequently necessary to obtain samples of water which are entirely free from self contamination. The need for aseptic sampling has long been recognized in bacteriological studies. However, it has not been generally appreciated that somewhat similar sampling techniques are also highly desirable for pesticide surveys and other studies where only trace quantities of chemicals are involved.

In the past, a wide variety of devices have been used for obtaining samples from natural bodies of water. Generally the sampling bottle is lowered by a wire to the desired depth afterwhich a messenger weight is allowed to slide down the support wire to actuate the closure mechanism. The messenger weight closure technique is unreliable where fast currents cause the suspending wire to depart widely from the vertical. Furthermore, virtually all of these sampling devices have been subject to self contamination due to the repeated use of the same sampling chamber.

It is therefore the principal object of the present invention to provide water sampling apparatus which is reliably free of all sources of self contamination.

It is a further object of the present invention to provide a water sampling device having a closure mechanism which obviates the use of a messenger weight.

The present invention provides a water sampling device which is actuated by means of an electrical signal or impulse. Thus the sample chamber may be filled at any time by remote control from above the surface. The sample chamber itself is provided with a sterile flexible plastic lining which is not reusable and which subsequently serves as a storage container for the water sample. Means are provided for opening the flexible plastic liner when the sampler is actuated, drawing a water sample into the plastic liner, and for closing the plastic liner after it is filled. After the sampler mechanism is brought to the surface, the water filled plastic liner is removed and replaced by a new one.

Additional objects and advantages of the invention will become apparent from the following description, accompanying drawings, and appended claims.

FIGURE 1 shows an overall view of the water sampling apparatus before actuation.

FIGURE 2 shows a sectional view of the water sampling apparatus before actuation.

FIGURE 3 shows schematically the operating principle of the water sampler.

FIGURE 4 shows the intake tube clamp in the open position.

FIGURE 5 shows a construction detail of the expendable sample container.

FIGURE 6 shows the water sampling apparatus after actuation.

FIGURE 7 shows an unfilled flexible plastic liner for the sampling apparatus.

FIGURE 8 shows a water filled flexible plastic liner from the sampling apparatus.

FIGURE 9 shows a front view of the control unit and cable reel used with the water sampling apparatus.

FIGURE 10 shows a top view of the control unit.

FIGURE 11 shows an alternate mode of operation of the water sampling apparatus.

Returning more specifically to FIGURE 1, an external view of the water sampling device is shown consisting of a control wire terminal housing 1 with a solenoid release 10 attached externally to the bottom surface. A pair of connecting struts, such as the strut 9, are rigidly fixed to opposite sides of the housing 1. The lower ends of the struts are pivotally attached to the cylinder 3. Thus the cylinder 3 can pivot about the axis of the clamp screw 37 when the clamp screw 37 and a similar clamp screw on the opposite side are loosened. A watertight electrical connector 2 connects the leads of an electrical cable 24 to the interior of the housing 1.

Referring to FIGURES 1 and 2 together it can be seen that a piston 4 having O-ring seals is fitted within the cylinder 3. A connecting rod 5 passes through the bottom cylinder cover 8 and terminates with the foot plate 7. A compression spring 6, when compressed, urges the foot plate 7 away from the bottom cylinder cover 8 and thus tends to force the piston 4 to the bottom end of the cylinder 3. A wire 12 attached to the foot plate 7 has its opposite end 23 secured to the plunger 11 of the solenoid 10 thus restraining the foot plate 7 so that the spring 6 is held in a compressed state. A cylindrically shaped thin film plastic container 20 is folded within the confined space above the piston 4. The upper circular edge of the plastic container 20 is attached to the inside rim of the plastic lid 18 so that the plastic lid 18 forms the top surface of the plastic container. When the folded flexible portion 20 of the plastic container is fitted into the confined space above the piston 4, the rim of the lid 18 fits snugly around the outside of the upper end of the cylinder 3.

Thus the upper end of the cylinder 3 is sealed and the flexible walls and bottom of the plastic container are folded above the piston 4. A tube fitting 19 in the lid 18 provides the only opening into the plastic container. One end of a piece of rubber tubing 15 is slipped over the fitting 19. A glass tube 17 sealed at one end and inserted into the rubber tubing 15 at the opposite end is snugly wedged into a hole in the clamp block 16. Thus the tube fitting 19 is effectively sealed by the rubber tubing 15 and the glass tube 17. A wire 13 attached to the foot plate 7 is connected to the loop 21 around the glass tube 17. A second loop on the extreme end of the wire 13 connects to the rod 14 which passes up through the clamp block 16 to the clamp 22. The clamp 22 passes across the top of the rubber tubing 15. The operation of the tube clamp 22 may be seen in FIGURE 4. When the solenoid 10 is actuated by an electrical impulse through the wire lead 29, the plunger 11 is withdrawn and the loop 23 released. When the wire 12 ceases to restrain the foot plate 7, the foot plate 7 is forced away from the bottom cylinder cover 8, by the spring 6, pulling with it the piston 4. When the foot plate 7 starts to move downward the loop 21 attached to the wire 13 breaks the glass tube 17 thereby allowing the end of the rubber tube 15 to spring out away from the sampler and admit water to the interior of the sample container 20. As the piston 4 is drawn downward, water is sucked into the flexible plastic container 20. Finally, as the piston 4 is pulled to the lower limit of its travel at the bottom of the cylinder 3, the second loop in the extreme end of the wire 13 pulls downward on the rod 14 thereby forcing the clamp 22 down across the rubber tube 15. Thus the contained water sample is sealed off by the clamping of the rubber tube. When the sampler is retrieved, a pinch clamp is placed on the rubber tube 15 between the fitting 19 and the clamp 22 before the plastic container 20 and associated lid 18 are removed from the cylinder 3. A temperature sensor 28 and a depth sensor 27 are schematically shown within the housing 1.

Generally, it would be desirable to know the temperature and depth at the sample location and these sensors may be easily incorporated into the water sampler as shown in the drawing.

FIGURE 3 shows schematically the operation of the water sampler. A push button switch 26 connects the solenoid 10 to the battery 25 through the electrical cable 24. The plunger 11 is retracted thereby releasing the loop 23 allowing the foot plate 7 to be forced away from the cylinder 3 by the compression spring 6. FIGURE 4 shows the operation of the clamp 22 on the rubber tube 15.

FIGURE 5 shows a construction detail of the sterile disposable sample container. The upper end of the thin film portion of the container is turned inside out so that it fits within and contacts the entire inside surface of the rim portion of the lid 18 to which it is permanently bonded. When the rim of the lid 18 is forced down over the top edge of the cylinder 3, the thin plastic film passes across the top edge of the cylinder and down between the outer surface of the cylinder and the inner surface of the rim portion of the lid 18. Thus the entire inside area of the rim portion of the lid 18 is bonded to the folded back upper end of the thin plastic sleeve. The relative thickness of the thin plastic film container 20 is greatly exaggerated in FIGURE 5 and in FIGURE 6 for clear illustration.

FIGURE 6 shows the water sampling apparatus described previously after being actuated by the release of the loop 23 by the solenoid plunger 11. The flexible plastic container 20 is shown filled with water and the clamp 22 has sealed off the rubber tubing 15. The broken glass tube 17 projects from the end of the rubber tubing 15. The clamp 22 is forced downward by tension of the wire 13 attached to the foot plate 7.

FIGURES 7 and 8 show the plastic container before and after being filled with water. The plastic container consists of a semi-rigid lid 18 with tube fitting 19 and associated side walls and bottom of thin flexible plastic film. The lid portion 18 being typically of polyethylene of 0.1 to 0.2 inch thickness and the sides and bottom of the container portion 20 being also of polyethylene and typically several thousanths of an inch thickness. Obviously the bottom could also be made semi-rigid by the use of thicker material if desired. This would increase slightly the volume of the water sample obtainable by a given piston displacement.

FIGURES 9 and 10 show the sampler control unit 30 with a cable reel 31 for storing the control cable 24. The cable 24 conductors are connected into the control unit 30 by means of the slip rings 36. Depth indicator 33 and temperature indicator 35 are optional. Push button 26 actuates the sampling mechanism.

FIGURE 11 shows an alternate mode of operation of the water sampler. The cylinder 40 is tilted to the horizontal position and clamped. The extra drag on the foot-plate 43 end of sampler causes it to orient in a current in the manner shown with the lid of the sample container 44 facing upstream. A simple check valve 45 located in the center of the lid 44 allows water to be drawn into the container by the piston action when the foot-plate 43 is released. A very light spring tension within the check valve 45 seals the opening except when the piston is being forced back by the spring 42. A wide variety of plastic check valves and one-way valves are commercially available for this use. This mode of operation is adequate when a slight amount of bacterial contamination can be tolerated such as for pesticide, trace element, and chemical pollution surveys.

An alternate construction for the water sample container would consist of a sealed flexible plastic bag. A removable lid would cover the end of the cylinder but would not be permanently attached to the flexible bag. A length of tubing or other fitting would be the only access to the inside of the flexible bag. In operation, the lid would be removed from the cylinder, the folded plastic bag placed inside the cylinder with its tube (or other fitting) passing through a hole in the lid with a watertight fit when the lid is replaced. It may readily be seen that this is equivalent to the sample container shown in the drawings except that in this alternate construction the lid portion would be reusable and, in fact, could be permanently hinged to the end of the cylinder.

The water sampling apparatus described herein is intended primarily for use in rivers, lakes, and estuaries but it would also be useful for some oceanographic work, particularly in shallow water. A number of alternate constructions are possible. For example, a group of these sampling devices may be clustered together and individually actuated by coded signals and separate signal discriminators. The sampling apparatus can be constructed to obtain almost any desired volume sample. The most practical size sampling devices would obtain sample volumes of between 250 and 500 milliliters. Samplers for obtaining water volumes up to one liter are entirely practical however. Thus the preferred dimensions for the water sampler would be a cylinder diameter of between 5 and 15 centimeters and a cylinder length of between 10 and 30 centimeters. The sample containers of polyethylene, including check valve (or rubber tube and glass tip), are packaged in a heat sealed plastic envelope and then gas sterilized with ethylene oxide. Preferred construction materials are: stainless steel cylinder, connecting rod, and foot plate; polyethylene sample container; piston of stainless steel, Delrin, or Teflon; O-rings of Teflon coated neoprene; spring of beryllium copper with a protective plastic coating or noble metal plating; and a solenoid coil vacuum potted in plastic with a Teflon coated bore and plunger for reduction of friction.

In conclusion, while I have described particular embodiments of my invention for purposes of illustration, it will be understood that various modification and adaptations thereof may be suggested to those skilled in the art without departing from the spirit and scope of the invention as defined in the following claims.

What is claimed is:

1. Water sampling apparatus of the character described comprising: a cylinder; a piston within the said cylinder; a spring urging the said piston toward the first end of the said cylinder; latching means for restraining the said piston adjacent the second end of the said cylinder against the force of the said spring; a flexible plastic bag folded within the said cylinder adjacent the second end, one end of the said plastic bag comprising a semi-rigid disk-shaped lid portion which fits snugly over the second end of the said cylinder; a one-way valve passing through the aforementioned lid portion for admitting water into the said plastic bag when the said piston is retracted; means for attaching the said cylinder to an electrically conductive cable; and means for electromechanically releasing the said latching means in response to an electrical signal from the aforementioned electrical cable.

2. Water sampling apparatus of the character described comprising: a cylinder; a piston within the said cylinder; a spring, the said spring urging the said piston toward the first end of the said cylinder; latching means for restraining the said piston adjacent the second end of the said cylinder against the force of the said spring; a removable lid for sealing the second end of the said cylinder; a flexible plastic bag folded within the second end of the said cylinder; a tubular fitting opening into the said plastic bag, the said bag being otherwise sealed; an opening in the said lid through which the said tubular fitting passes to the outside of the said cylinder, the said opening providing a watertight seal around the said tubular fitting; means for attaching the said cylinder to an electrically conductive cable; and means for electromechanically releasing the said latching means in response to an electrical signal from the aforementioned electrical cable.

3. Water sampling apparatus of the character described comprising: a cylinder; a piston within the said cylinder;

a spring urging the said piston toward the first end of the said cylinder; means for restraining the said piston adjacent the second end of the said cylinder against the force of the said spring; a removable lid for sealing the second end of the said cylinder; a flexible plastic bag folded within the second end of the said cylinder; a tubular fitting opening into the said plastic bag, the said bag being otherwise sealed; an opening through the said cylinder adjacent the second end through which the said tubular fitting passes to the outside of the said cylinder, the said opening providing a watertight seal around the said tubular fitting; means for attaching the said cylinder to an electrically conductive cable; and means for releasing the said piston restraining means in response to an electrical pulse from the aforementioned electrical cable.

4. Water sampling apparatus of the character described comprising: a cylinder; a piston within the said cylinder; a spring urging the said piston toward the first end of the said cylinder; latching means for restraining the said piston adjacent the second end of the said cylinder against the force of the said spring; a flexible plastic bag folded within the said cylinder adjacent the second end, one end of the said plastic bag comprising a rigid disk-shaped lid portion which fits snugly over the second end of the said cylinder; a tube fitting passing through the aforementioned lid portion of the said plastic bag; a length of rubber tubing connected to the outside of the said tube fitting; a sealed glass tube inserted in the end of the said rubber tubing opposite the said tube fitting; means for attaching the said cylinder to an electrically conductive cable; means for electromechanically releasing the said latching means in response to an electrical signal from the aforementioned electrical cable; means for breaking the said glass tube substantially at the same time the said latching means is released; and means for clamping the said rubber tube as the said piston approaches the first end of the said cylinder.

References Cited

UNITED STATES PATENTS 3,302,464   2/1967   Langguth _____ 73—425.4

LOUIS R. PRINCE, *Primary Examiner.*

S. C. SWISHER, *Assistant Examiner.*